(12) United States Patent
Buer et al.

(10) Patent No.: US 7,773,754 B2
(45) Date of Patent: Aug. 10, 2010

(54) KEY MANAGEMENT SYSTEM AND METHOD

(75) Inventors: Mark L. Buer, Gilbert, AZ (US); Joseph J. Tardo, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 1317 days.

(21) Appl. No.: 10/191,365

(22) Filed: Jul. 8, 2002

(65) Prior Publication Data

US 2004/0005061 A1 Jan. 8, 2004

(51) Int. Cl.
*H04L 9/00* (2006.01)
*H04K 1/00* (2006.01)

(52) U.S. Cl. ............... 380/277; 380/28; 380/29; 380/30; 380/44; 380/278; 380/279; 380/281; 380/282; 380/283; 380/284; 380/285; 713/160; 713/165; 713/169; 713/171; 713/192; 713/193; 713/194; 726/3; 726/4; 726/30

(58) Field of Classification Search ............... 713/160, 713/161, 170, 169; 380/255, 277
See application file for complete search history.

(56) References Cited

U.S. PATENT DOCUMENTS

| | | | |
|---|---|---|---|
| 4,238,854 A * | 12/1980 | Ehrsam et al. | 713/165 |
| 5,384,850 A * | 1/1995 | Johnson et al. | 380/52 |
| 5,457,748 A | 10/1995 | Bergum et al. | |
| 5,809,144 A * | 9/1998 | Sirbu et al. | 705/53 |
| 5,949,881 A * | 9/1999 | Davis | 713/189 |
| 6,003,117 A | 12/1999 | Buer et al. | |
| 6,101,605 A | 8/2000 | Buer | |
| 6,125,185 A * | 9/2000 | Boesch | 380/285 |
| 6,178,244 B1 * | 1/2001 | Takeda et al. | 380/277 |
| 6,246,771 B1 * | 6/2001 | Stanton et al. | 380/286 |
| 6,260,132 B1 | 7/2001 | Buer | |
| 6,725,375 B2 * | 4/2004 | Fujioka | 713/191 |
| 6,795,555 B1 * | 9/2004 | Parisien et al. | 380/47 |
| 6,963,979 B2 * | 11/2005 | Fairclough et al. | 713/189 |
| 6,978,152 B1 * | 12/2005 | Yamaashi et al. | 455/526 |
| 6,983,366 B1 * | 1/2006 | Huynh et al. | 713/168 |
| 7,079,655 B1 * | 7/2006 | Tochikubo et al. | 380/281 |
| 7,243,842 B1 * | 7/2007 | Leon et al. | 235/381 |
| 7,519,811 B1 * | 4/2009 | Hara | 713/151 |

(Continued)

FOREIGN PATENT DOCUMENTS

WO   WO 01/63831 A1   8/2001

(Continued)

OTHER PUBLICATIONS

European Search Report dated Oct. 31, 2003 for EP 03 01 5375.

*Primary Examiner*—Edan Orgad
*Assistant Examiner*—Jenise E Jackson
(74) *Attorney, Agent, or Firm*—Sterne, Kessler, Goldstein & Fox P.L.L.C.

(57) ABSTRACT

Methods and systems are disclosed for providing secured data transmission and for managing cryptographic keys. One embodiment of the invention provides secure key management when separate devices are used for generating and utilizing the keys. One embodiment of the invention provides secure storage of keys stored in an unsecured database. One embodiment of the invention provides key security in conjunction with high speed decryption and encryption, without degrading the performance of the data network.

20 Claims, 14 Drawing Sheets

U.S. PATENT DOCUMENTS

| | | |
|---|---|---|
| 2001/0026619 A1 | 10/2001 | Howard et al. |
| 2002/0126850 A1* | 9/2002 | Allen et al. ................. 380/277 |
| 2003/0028699 A1* | 2/2003 | Holtzman et al. ........... 710/301 |
| 2003/0084290 A1* | 5/2003 | Murty et al. ................. 713/168 |
| 2004/0202328 A1* | 10/2004 | Hara .......................... 380/270 |
| 2004/0225885 A1* | 11/2004 | Grohoski et al. ............ 713/189 |
| 2006/0177067 A1* | 8/2006 | Kim et al. ................... 380/278 |
| 2007/0192617 A1* | 8/2007 | Brickell ...................... 713/183 |

FOREIGN PATENT DOCUMENTS

WO     WO 02/37243 A2     5/2002

* cited by examiner

KEY MANAGEMENT SYSTEM AND METHOD

FIELD OF THE INVENTION

The invention relates generally to the field of data communications and, more particularly, to systems and methods for providing secured data transmission and for managing cryptographic keys.

BACKGROUND OF THE INVENTION

Cryptographic techniques are used in data networks to transmit data securely from one location in a network to another location in the network. Typically, a device connected to the network encrypts data using a cipher algorithm and an encryption key. The device sends the encrypted data over the network to another device that decrypts the data using the cipher algorithm and a decryption key.

It is essential in this scenario that the two devices have compatible cipher keys. That is, the decryption key can decrypt messages encrypted with the encryption key. In symmetric cryptographic systems identical cipher keys are used to encrypt and decrypt the data. In asymmetric cryptographic systems separate public and private cipher keys are used to encrypt and decrypt the data.

Several standards have been developed to secure data transmission over data networks. For example, the Internet Security Protocol (commonly referred to as "IPsec") may be used to establish secure host-to-host pipes and virtual private networks over the Internet. To this end, IPsec defines a set of specifications for cryptographic encryption and authentication. IPsec supports several algorithms for key exchange, including an Internet Key Exchange ("IKE") algorithm for establishing keys for data sessions between hosts.

The Secure Sockets Layer ("SSL") protocol also was developed to provide secure Internet transmission. SSL defines encryption, server and client authentication and message authentication techniques. SSL also supports the RSA public key exchange, a well known public key encryption system.

In general, cipher algorithms are relatively complex and upon execution consume a significant amount of processing is power. To offload encryption/decryption processing from the host processor, dedicated hardware devices, commonly referred to as cryptographic accelerators, may be used to perform the cipher algorithms. In this case, the keys controlled by the host processor must be shared with the cryptographic accelerator when data is to be decrypted or encrypted.

The standards and algorithms set forth above require some form of key exchange. To ensure that the data cannot be decrypted by an unauthorized party, the keys must be protected so they are known only by trusted parties. Thus, it is imperative that the devices are configured so they can receive and store keys without the keys being compromised.

Conventionally, techniques for protecting keys involve, for example, applying tamper evident coatings such as epoxy to the devices and their associated data memories. However, such techniques present significant heat and manufacturing problems.

Moreover, some SSL applications involve the use of expensive security modules to provide data security in a network. The function of the security module is to do high-level management of system keys including, for example, key distribution, key generation and enforcing key policies. Significantly, the security module must protect keys not just on a session basis, but must protect private keys for large organizations. Hence, security modules are very secure devices (typically FIPS-140-2, certification level 2, 3 or 4) and are, as a result, relatively expensive.

Moreover, SSL typically is used in client-to-web page applications. Here, for every TCP connection between a client and the web page, a unique public/private key session is created. As a result, the security module may need to manage thousands of keys to support these connections.

To protect these private keys, most of the encryption and decryption operations are performed inside the security module. Given the size of the task at hand, this approach tends to be relatively expensive. Accordingly, a need exists for improved cryptographic techniques for data networks.

SUMMARY OF THE INVENTION

The invention relates to methods and associated systems for providing secured data transmission and for managing cryptographic keys. For example, a device constructed according to the invention may provide secure transmission and storage of keys and provide decryption and encryption of data that is transmitted over the network at a very high data rate.

One embodiment of the invention provides secure key management when separate devices are used for generating and utilizing the keys. For example, a system that uses a cryptographic accelerator typically includes a separate processor that generates the keys (e.g., a host processor). Thus, at some point in time the keys are sent from the host processor to the cryptographic accelerator so that the cryptographic accelerator can decrypt the received encrypted data. In accordance with this embodiment of the invention, the host processor encrypts the keys before sending them to the cryptographic accelerator. This involves the use of another key, called a key encryption key ("KEK"). The cryptographic accelerator, in turn, includes a decryption circuit for decrypting the keys using the KEK. The cryptographic accelerator also includes a key manager that facilitates exchange of the KEK used to encrypt and decrypt the keys generated by the host processor.

One embodiment of the invention provides secure storage of keys stored in an otherwise unsecured database. In accordance with this embodiment of the invention, the processor that generates the keys encrypts the keys before sending them to the database. As in the embodiment above, this involves the use of a KEK. The processor that decrypts the data includes a decryption circuit that uses KEK to decrypt the keys. Again, a key manager is used to facilitate exchange of the KEK used to encrypt and decrypt the keys stored in the database.

One embodiment of the invention provides key security in conjunction with high speed decryption and encryption, without degrading the performance of the data network. Here, a cryptographic accelerator performs the cipher algorithms for the data sent over the network and a stream cipher decrypts the encrypted keys that are associated with the data sent over the network. Significantly, by using a single KEK to encrypt all the keys associated with the network data, the key stream for the stream cipher need not be calculated in real-time. As a result, the keys may be decrypted using relatively simple, and therefore fast, operations.

BRIEF DESCRIPTION OF THE DRAWINGS

These and other features, aspects and advantages of the present invention will be more fully understood when considered with respect to the following detailed description, appended claims and accompanying drawings, wherein:

DETAILED DESCRIPTION OF THE INVENTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

Figure 1:
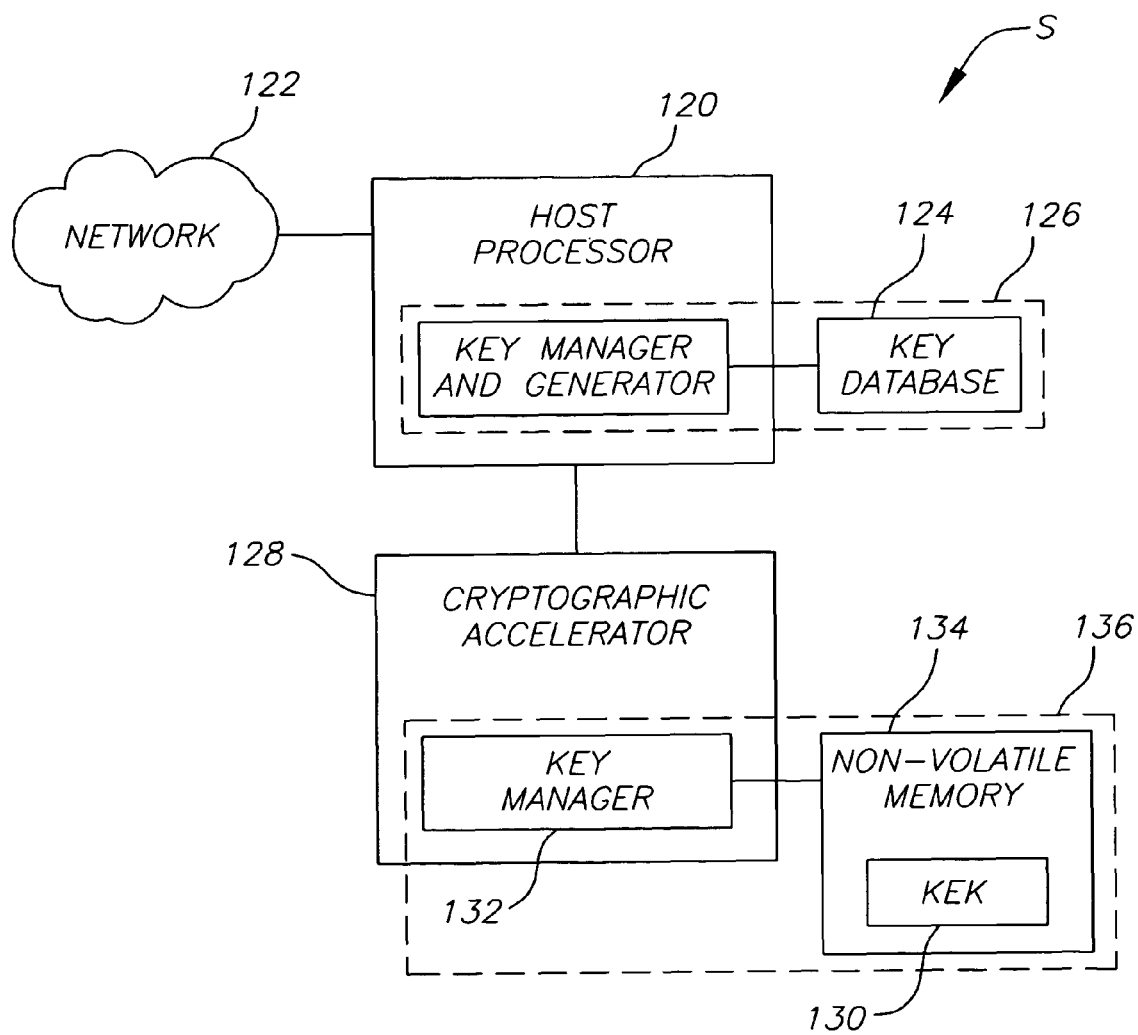
FIG. 1 is a block diagram of one embodiment of a cryptographic system constructed in accordance with the invention.

FIG. 1 is a block diagram of one embodiment of a cryptographic system S constructed in accordance with the invention. A host processor 120 generates one or more keys (e.g., cipher keys) associated with one or more messages sent between the host processor 120 and a data network 122 (hereafter referred to as a "network"). Typically, the keys are protected by, for example, encapsulating the associated data memory 124 in epoxy at the time of manufacture. Thus, the keys are stored in a "protected portion" of the system S.

The host processor 120 cooperates with a cryptographic accelerator 128 to decrypt and encrypt messages received from and sent to the network 122, respectively. That is, when the host processor 120 receives an encrypted message from the network 122, the host processor 120 sends this message to the cryptographic accelerator 128. The cryptographic accelerator 128 decrypts the message and sends the decrypted message back to the host processor 120. Conversely, when the host processor 120 needs to send a message over the network 122 securely, the host processor 122 first sends the message to the cryptographic accelerator 128. After encrypting the message, the cryptographic accelerator 128 sends the encrypted message to the host processor 120 for transmission over the network 122.

The host processor 120 may also send keys associated with the message to the cryptographic accelerator 128. In a packet switching network, the host processor 120 typically assigns a unique key to each session the host processor 120 has established over the network. Thus, as packets for a given session arrive or need to be sent out, the host processor 120 sends the corresponding key to the cryptographic accelerator 128 so the cryptographic accelerator 128 can decrypt or encrypt those packets.

In accordance with this embodiment of the invention, the host processor 120 encrypts the keys using a key encryption key ("KEK") 130 before sending them to the cryptographic accelerator 128. In this way, the keys are secured even when they leave the secure bounds 126 of the host processor 120. The cryptographic accelerator 128, in turn, includes a decryption circuit that uses KEK 130 to decrypt the encrypted keys. For convenience the term "security association" will be used herein to refer to key information. This key information may include, for example, a key or keys, one or more encrypted keys and associated identifiers and other information such as rules relating to how to use the keys and the types of algorithms that may be used to decrypt the keys.

A key manager 132 in the cryptographic accelerator 128 cooperates with a key manager in the host processor 120 to ensure that both have a compatible KEK 130. The KEK 130 may be established using either symmetric or asymmetric (i.e., public) keys.

In the case of a symmetric key, provisions are made to ensure that both the host processor 120 and the key manager 132 have access to the same initial KEK 130 when the systems are operated for the first time. In addition, in accordance with one embodiment of the invention, the host processor 120 can change KEK 130. In this case, provisions are made for modifying the KEK 130 used by the key manager 132.

Alternatively, when an asymmetric key scheme is used, a processor that manages the keys and the key manager 132 cooperate to exchange public and private keys that are used to encrypt and decrypt the KEKs 130. In this way the KEKs 130 may be securely transmitted between the processor and the key manager 132.

In one embodiment, the KEK 130 is stored in a non-volatile data memory device 134. In a symmetric key system the initial KEK 130 may be programmed into the non-volatile memory 134 when the system is manufactured. In an asymmetric key system, a private key and a certificate may be stored in the non-volatile memory 134 when the system is manufactured. Typically, the non-volatile memory device 134 (e.g., an EEPROM) is protected by epoxy or some other means. Hence, the non-volatile memory 134 and the key manager 132 may be in a "protected portion" of the system. Moreover, the system typically is designed so that only the key manager 132 has access to the portion of the non-volatile memory 134 that contains sensitive data such as KEK 130. Alternatively, the non-volatile memory 134 may be integrated into the key manager's integrated circuit to control access to the non-volatile memory 134.

Figure 2:
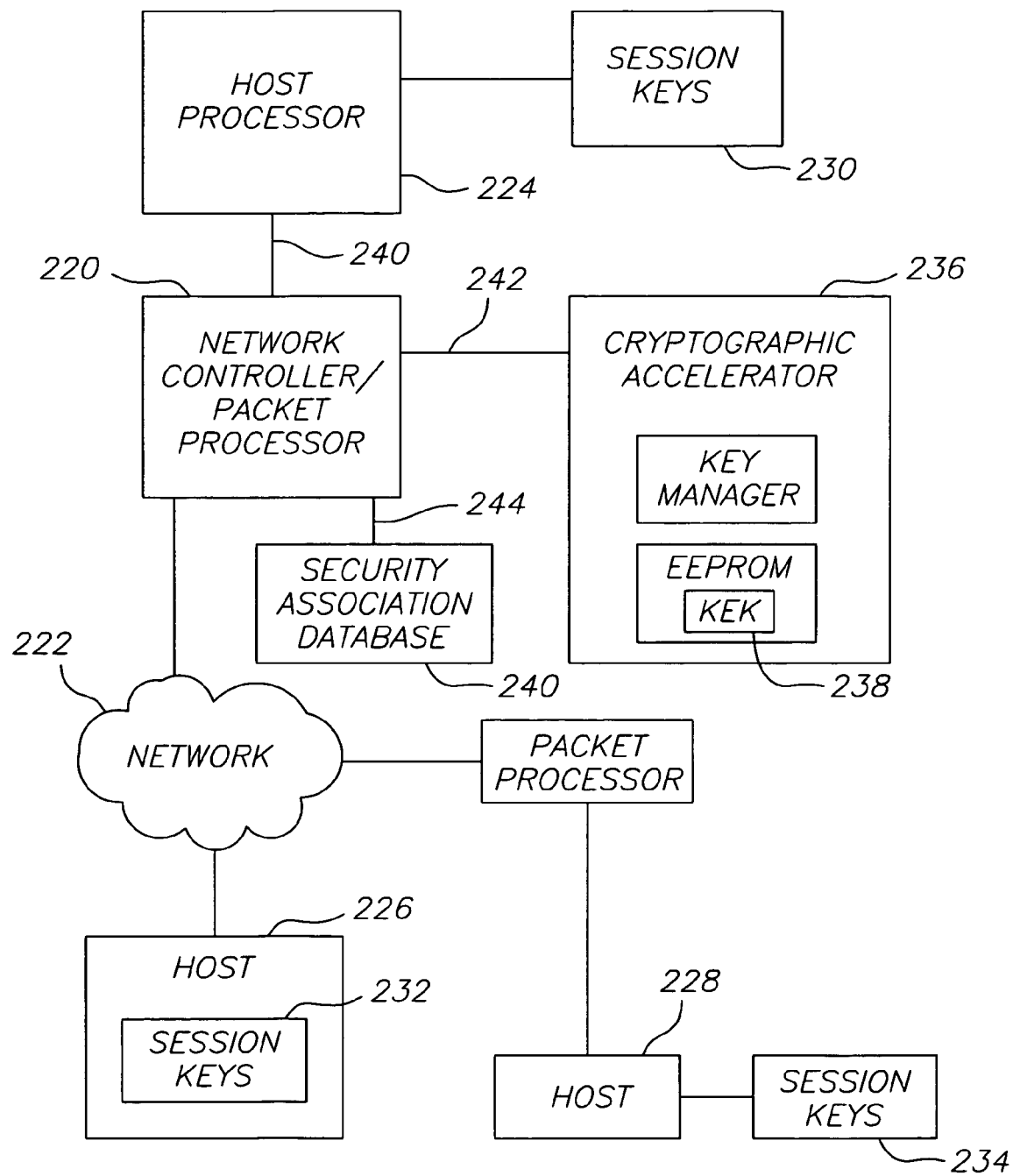
FIG. 2 is a block diagram of one embodiment of a cryptographic system in a packet data network, constructed in accordance with the invention.

FIG. 2 depicts another embodiment of a cryptographic system constructed in accordance with the invention. This system includes a network controller ("NC") and a packet processor ("PP") block 220. The network controller/packet processor 220 performs the bulk of the network interface and packet processing operations. When packets are being received, these operations may include identifying the packets on the network 222 that are destined for the host processor 224, stripping packet header information to obtain the data in the packet and sending the data to the host processor 224. When packets are being sent out, these operations may include encapsulating and formatting the packets and adding an appropriate identifier.

FIG. 2 also depicts how the host processor 224 communicates with other host processors 226 and 228 by establishing connections with those host processors to send messages via a packet network 222, in this case the Internet. In some applications these connections may be referred to as sessions. Thus, one or more sessions may be established between the host processor 224 and the host processor 226. And one or more sessions may be established between the host processor 224 and the host processor 228.

After a connection is established, some of the subsequent messages associated with the session may need to be transmitted securely, for example, when the message contains financial information. In this case, the host processors cooperate to establish a set of keys for each session so that each host processor may decrypt the data encrypted by the other host processor. These keys are uniquely associated with a session and are referred to as session keys 230, 232, 234.

Protocols such as IPsec require that each packet contain information that identifies which set of keys are to be used to decrypt the packet. Typically, the identifier consists of the address of the security association or a unique identifier associated with the session. Thus, and identifier may or may not be stored with a security association.

In the embodiment of FIG. 2, the network controller/packet processor 220 identifies packets that are encrypted and sends them to the cryptographic accelerator 236 for decryption. The cryptographic accelerator 236 decrypts the packets using the session key associated with the packet and sends the decrypted packet back to the network controller/packet processor 220. The network controller/packet processor 220 then routes the data to the host processor 224.

To further off-load the computational burden of packet processing from the host processor 224, the network controller/packet processor 220 is responsible for identifying the session of a given packet and sending the corresponding session key to the cryptographic accelerator 236.

In accordance with this embodiment of the invention, these session keys are encrypted using KEK 238 and stored in a database 240 as security associations. Thus, the network controller/packet processor 220 associates each security association with a particular session or sessions. When the network controller/packet processor 220 receives an encrypted packet associated with a session, the network controller/packet processor 220 sends the packet and the security association to the cryptographic accelerator 236.

The cryptographic accelerator 236 decrypts the security association using KEK 238 as described above. In this embodiment, the KEKs 238 are stored in a non-volatile data memory (e.g., EEPROM) that is located on the same integrated circuit as the key manager and the cryptographic accelerator 236. After decrypting the security associations the cryptographic accelerator 236 discards the decrypted security association and sends the decrypted packet back to the network controller/packet processor 220. Thus, unencrypted security associations never leave the protected cryptographic accelerator 236.

Significantly, since the security associations are encrypted, the database device 240 does not need to be protected with epoxy or other methods. Moreover, the database 240 can be located remote from the other components in FIG. 2. Theoretically, the encrypted security associations may be stored in any data memory in the network. As a result, significant costs savings may be realized in a system constructed according to the invention.

When the host processor 224 needs to transmit a packet over the network 222, the host processor 224 sends the packet and the associated security association to the cryptographic accelerator 236. The cryptographic accelerator 236 decrypts the security association and uses the extracted session key information to encrypt the packet data. Then, the cryptographic accelerator 236 sends the encrypted packet to the network controller/packet processor 220 for routing over the network 222.

Figure 3:
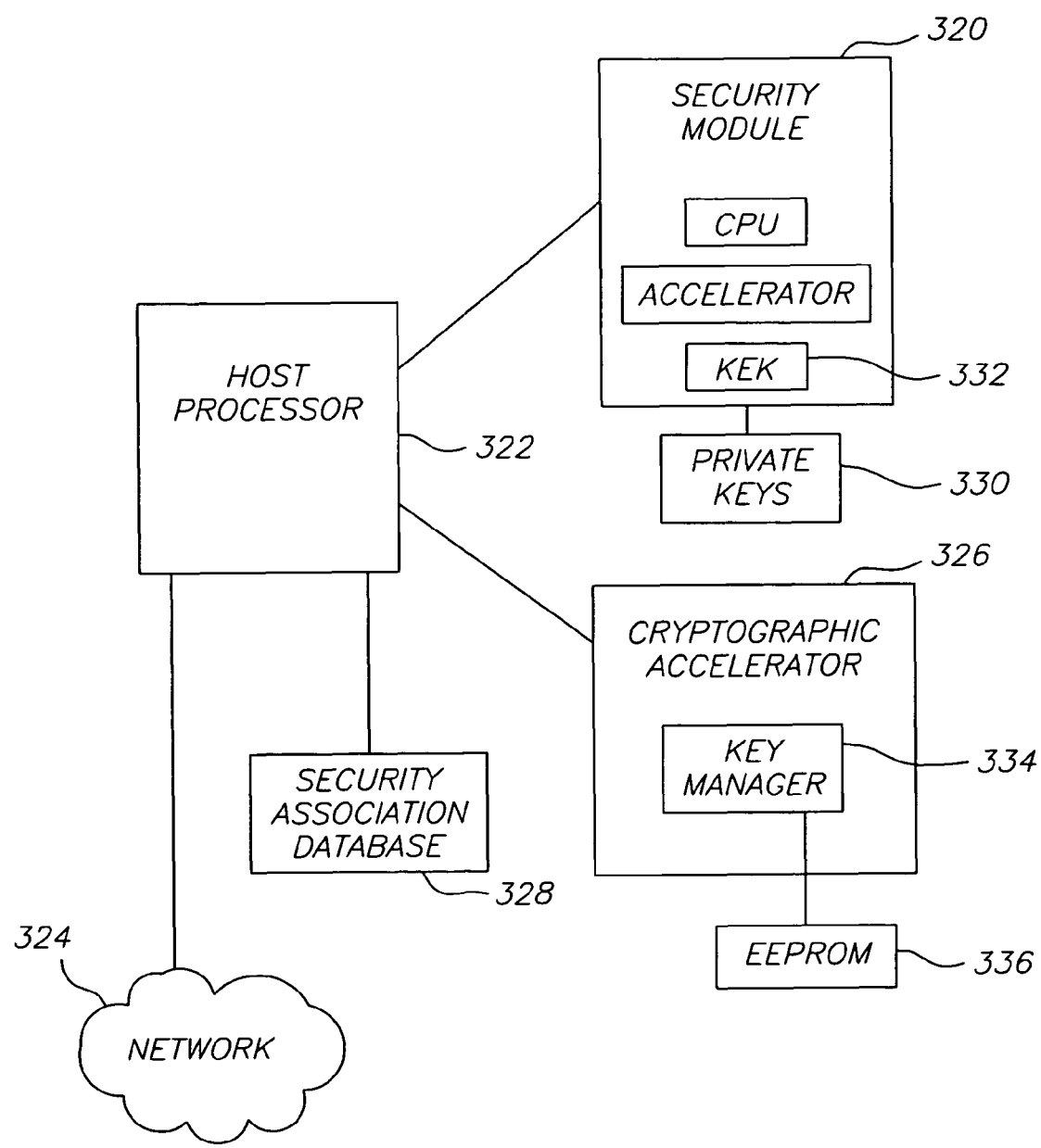
FIG. 3 is a block diagram of another embodiment of a cryptographic system constructed in accordance with the invention.

FIG. 3 depicts an embodiment of the invention where a security module 320 uses the SSL protocol to provide data security in a network. A host processor 322 (e.g., a server) interfaces with a network 324 to communicate with client applications running on other processors (not shown) connected to the network 324. In a similar manner as discussed above, the host processor 322 cooperates with a cryptographic accelerator 326 and a database 328 containing secured security associations to decrypt encrypted packets received from the network 324 and to encrypt packets sent to the network 324.

As discussed above, SSL uses a public/private key scheme. Thus, a secure connection may be established using standard public key techniques. For example, a server sends its signed public key to a client, the client verifies the public key then sends session information to the server encrypted with the server's public key. The keys to be used for the session are then derived from this information and the server's private key.

The security module 320 controls the key generation operations. Typically, a security module 320 will maintain the private keys for the server and enforce rules relating to how private keys may be added and signed.

In accordance with this embodiment of the invention, the majority of the key processing operations are performed by the host processor 322 and the cryptographic accelerator 326. As a result, private keys must be passed between the security module 320 and the host processor 322 and the cryptographic accelerator 326. To protect these keys, the security module 320 encrypts them with a KEK 332 before they are sent to the cryptographic accelerator 326 (via the host processor 322).

Moreover, because the security module 320 may be remote from the cryptographic accelerator 326 it is advantageous to use an asymmetric key scheme to secure the transfer of keys between the security module 320 and the cryptographic accelerator 326. These and other aspects of this embodiment are treated in more detail in the sections that follow.

Figure 4:
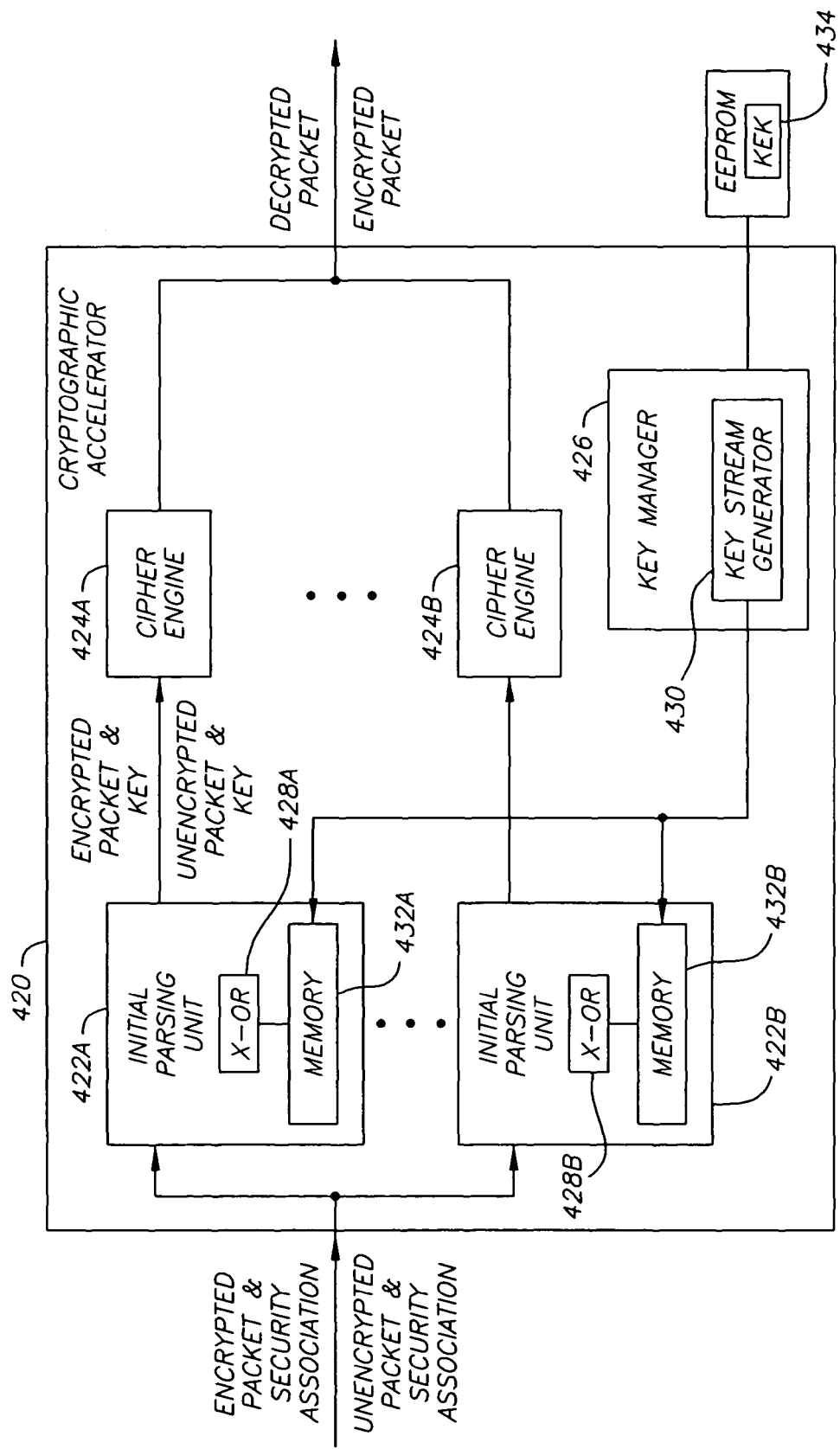
FIG. 4 is a block diagram of one embodiment of a cryptographic accelerator constructed in accordance with the invention.
Figure 5:
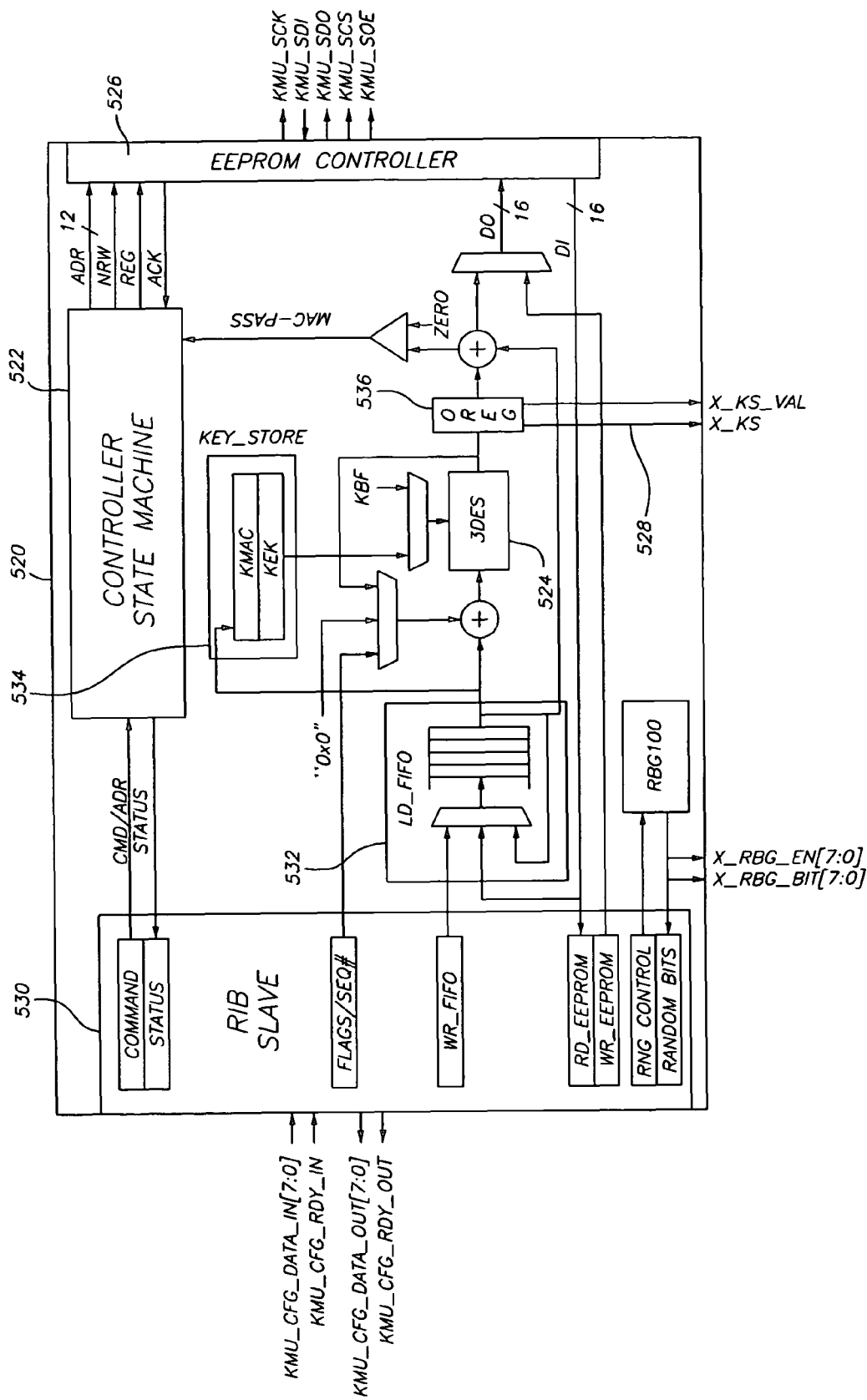
FIG. 5 is a block diagram of one embodiment of a key manager constructed in accordance with the invention.

Referring now to FIGS. 4 and 5, the structure of one embodiment of a cryptographic accelerator and a key manager will be treated in more detail.

FIG. 4 depicts one embodiment of a cryptographic accelerator 420 that includes a stream cipher circuit for decrypting security associations. The primary function of the cryptographic accelerator 420 is to decrypt encrypted packets and encrypt unencrypted packets for a processor that handles packets routed to and from the network (e.g., the network controller/packet processor, not shown). Thus, the cryptographic accelerator 420 receives encrypted packets and associated encrypted security associations and outputs the decrypted packet or it receives unencrypted packets and associated encrypted security associations and outputs the encrypted packet.

The cryptographic accelerator includes one or more initial parsing units ("IPU") 422A and 422B, cipher engines 424A and 424B and a key manager 426. The IPUs 422A, 422B parse security association data from the encrypted/unencrypted packets to decrypt the encrypted security associations. The cipher engines 424A, 424B are processors that decrypt the encrypted packets and/or encrypt the unencrypted packets. In this embodiment, the cipher engines 424A, 424B are custom processors that use the decrypted security associations from the IPUs 422A, 422B to encrypt or decrypt packets. The key manager manages the KEKs 434 used to decrypt the security associations.

In one embodiment, the IPU 422A, 422B includes a stream cipher circuit for decrypting the security associations. In this case, the key manager 426 includes a key stream generator 430 that generates a key stream based on KEK 434. The key manager 426 sends the key stream to each of the IPUs 422A, 422B where it is stored in a buffer 432A and 432B. The IPU 422A, 422B includes an exclusive-or circuit 428A and 428B that operates on the stored key stream and the encrypted security association to generate a decrypted security association. By implementing the security association decoding with such a simple circuit, a device constructed according to the invention can process packet data at gigabit data rates without a degradation in performance, using a relatively inexpensive architecture.

The IPU 422A, 422B sends the decrypted security association to the cipher engine 424A, 424B. Thus, the cipher engine 424A, 424B receives the encrypted packet or the unencrypted packet, a decrypted key and, in some embodiments, other information needed for the decryption operation. The cipher engine 424A, 424B decrypts/encrypts the encrypted/unencrypted packet using the key and sends the decrypted/encrypted packet back to the processor (e.g., the network controller/packet processor). Significantly, this embodiment may be implemented so that the decrypted security association does not leave the cryptographic accelerator 420.

FIG. 5 depicts one embodiment of a key manager 520. The primary function of the key manager 520 is to provide the KEK or associated stream to a decryption engine that decrypts security associations such as session keys (e.g., the IPU, not shown). To this end, the key manager 520 coordinates with the processor that generates the keys (e.g., the host processor, not shown).

The key manager 520 includes a controller state machine 522 that controls the overall operation of the key manager 520, including the operation of a triple DES ("3DES") core 524 and an EEPROM controller 526. The 3DES core 524 performs authentication and encryption operations. In one embodiment, the 3DES core 524 supports 3DES-CBC Encrypt (MAC) and 3DES-OFB Encrypt. In this embodiment, the CBC encryption operation used for MAC (message authentication code) mode and OFB encrypt/decrypt mode use the same hardware structure. Here, the CBC encryption operation involves exclusive-ORing plain text data with the initial vector or previous encrypted block of data. The OFB operation may be performed on the same hardware using all zeros for the plain text. The resulting data is the key stream output via line 528. Details of CBC and OFB modes of operation for DES/3DES may be found in the publication FIPS-81 Modes of Operation.

The key manager 520 also includes a control register 530 that interfaces with the cryptographic accelerator to enable the cryptographic accelerator or, indirectly, another processor to control and receive information from the key manager 520. Finally, the key manager 520 also includes data storage 532, 534 and 536 for keys and other data.

Referring now to FIGS. 6 through 9, example operations of one embodiment of a cryptographic system will be treated in more detail.

Figure 6:
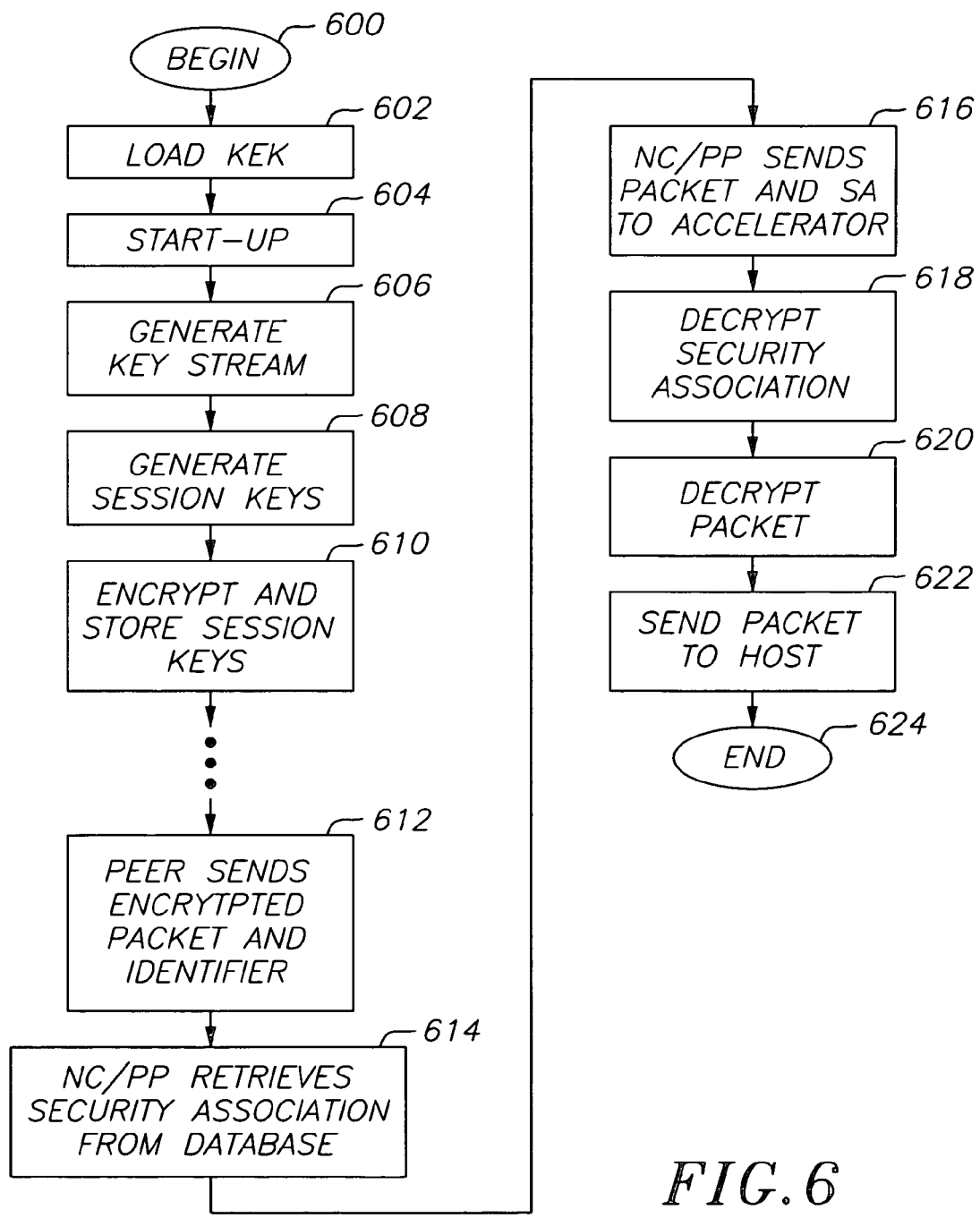
FIG. 6 is a flowchart representative of one embodiment of operations that may be performed in accordance with the invention.

FIG. 6 depicts typical operations that may be performed by a cryptographic system according to the invention. This example describes an embodiment that uses a symmetric key.

The flowchart beings at block 600 with operations that, in general, relate to initialization operations. Referring, for example, to the system of FIG. 2, when the system is being manufactured the initial value for the KEK is loaded into the EEPROM and the host processor (block 602).

Figure 7:
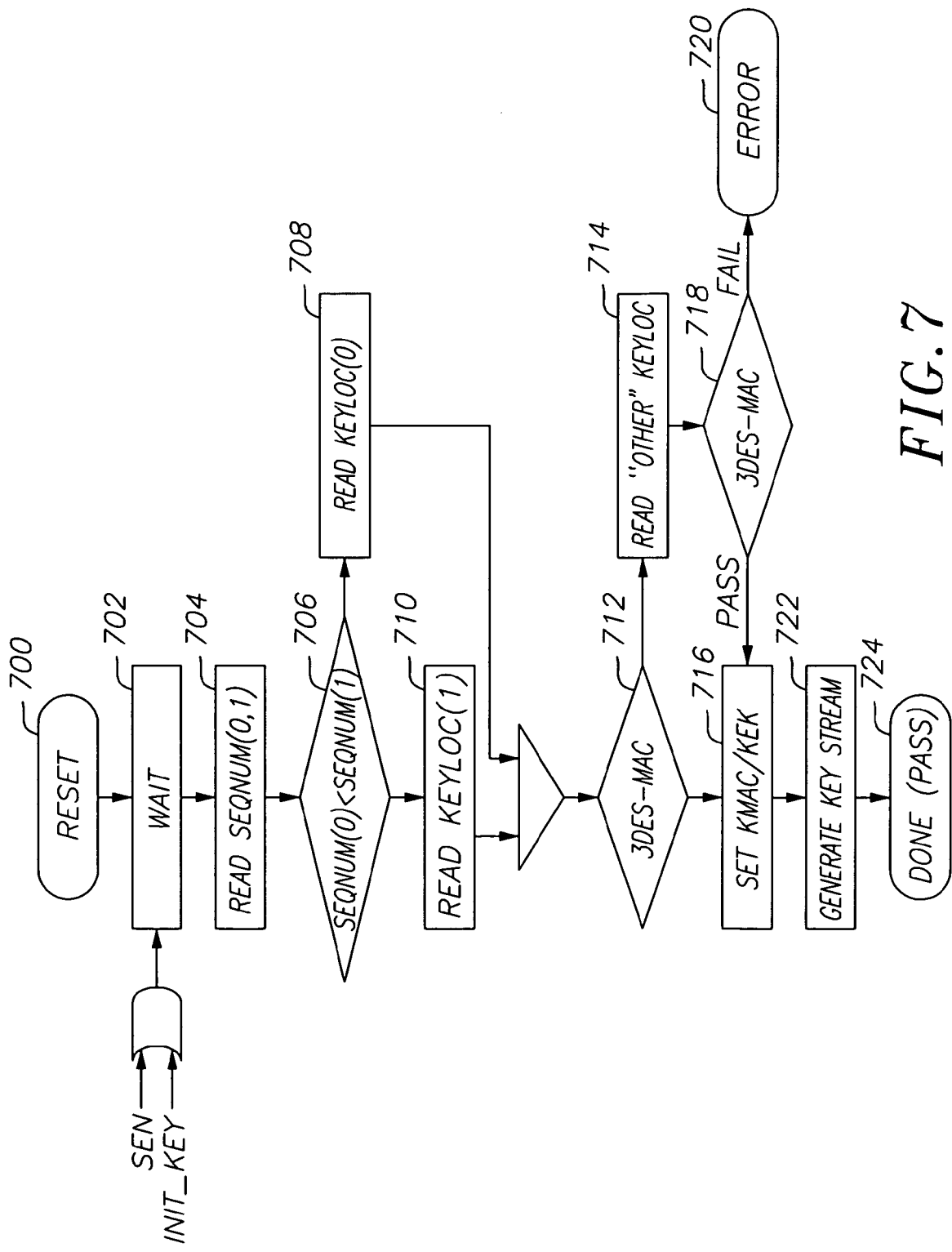
FIG. 7 is a flowchart representative of one embodiment of initialization operations that may be performed in accordance with the embodiment of FIG. 2.

Referring now to FIG. 7, one embodiment of start-up operations (block 604, FIG. 6) for the key manager will be discussed in detail. Upon reset (block 700), the key manager waits for the INIT_KEY command (block 702). Optionally, an input signal SEN (not shown) may be used by an external device to initiate the INIT_KEY command. The key manager reads the sequence number from both key locations in the EEPROM (block 704). The sequence numbers are compared to determine the "larger" of the two numbers (block 706). The key location with the largest sequence number is read from EEPROM by the key manager (blocks 708 or 710). The data read from the key location is verified using the DES-MAC algorithm with the initial vector=0 using a fixed internal key Kbf="reubkram" (block 712).

If the MAC passes, the correct key location has been selected. The key manager will then load the initial vector, KMAC and KEK values into internal registers (block 716). The FLAGS/SeqNum fields are set in a register that is readable by the host processor. If the MAC fails, the other key location is used to repeat the MAC process (blocks 714 and 718). If both fail, the key manager enters an error state (block 720).

Once the proper key location has been determined in the initialization phase, the key manager will generate the key stream required for the security associate decryption (block 722).

Figure 8:
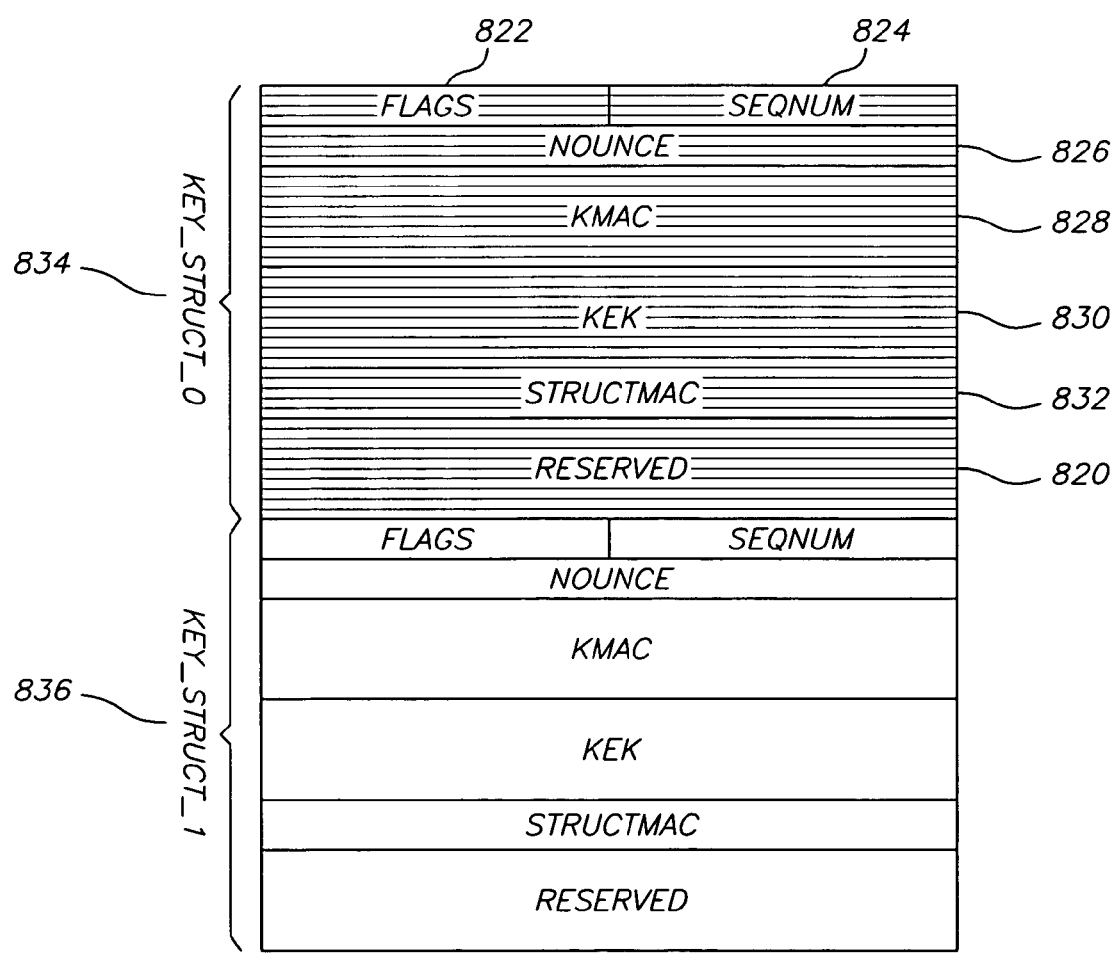
FIG. 8 is a representation of one embodiment of a key structure in accordance with the invention.

FIG. 8 depicts one embodiment of a key structure 834, 836 that may be used in conjunction with a symmetric KEK. The key structure includes flags 822 that may be used, for example, to designate whether the KEK value may be updated. The sequence number (SeqNum) 824 is incremented for each new KEK value that is loaded into the key manager. NOUNCE 826 is a 32 bit random value that is used in combination with the sequence number to generate the initial vector for the encryption with the KEK. KMAC 828 contains the key used to authenticate an update key operation. Kek 830 is the key encryption key that is used to generate the key stream for decrypting the security associations. StructMAC 832 is the message authentication code for the key structure. This MAC is calculated using the initial vector=0 and Kbf internal key. As was discussed above in conjunction with FIG. 7, two key structures 834 and 836 are stored in the EEPROM.

Referring again to FIG. 6, when the system is booted for the first time, the key manager retrieves KEK from the EEPROM and stores it into the key structure data memory. The KEK is then sent to the 3DES that generates the key stream (block 606). In one embodiment, the key stream is stored in the output register until it is needed by an IPU.

The key stream is generated using 3DES-OFB encryption with the initial vector generated using the NOUNCE and SeqNum value (IV=(FLAGS/SEQ & NOUNCE)). The encryption key is KEK. The key stream is generated 64 bits at a time and transferred to an external destination block on a 1 bit bus.

When the host processor commences communications with other host processors, it typically negotiates sets of keys to be used during those communications. For example, using the Internet Key Exchange ("IKE") protocol, the host processor will negotiate with a peer to create 2 sets of keys for every session between the peers (block 608). Thus, the host processor will, over time, create a set of keys in a key database. The host processor will add keys to and delete keys from the database as sessions are created and terminated, respectively.

The host processor 224 encrypts each of the session keys using KEK and sends them to the network controller/packet processor 220. Associated with each of the encrypted keys is an identifier that associates the key with a particular session. The network controller/packet processor 220 stores the encrypted security associations (e.g., the encrypted keys along with their associated identifiers) in a database 240 (block 610).

At this point, the initialization process is essentially complete. Thus, the system is ready to receive or transmit encrypted packets.

When a remote peer sends encrypted data to the host processor during a session, the peer encrypts the data using the agreed upon key. The peer assembles the data in a packet, including the identifier (e.g., as defined by IPsec) associated with the key that must be used to decrypt the packet (block 612).

When an encrypted packet is received by the network controller/packet processor 220, the network controller/packet processor 220 reads the identifier in the packet to determine which security association should be used with that packet (block 614). For example, if the identifier consists of the address of the security association the network controller/packet processor 220 reads the data from that address in the database 240. Alternatively, if the security association includes the identifier, the network controller/packet processor 220 may scan the database for a security association that contains an identifier that matches the identifier for the packet. The network controller/packet processor 220 sends the packet and the security association to the cryptographic accelerator 236 (block 616).

The cryptographic accelerator 236 decrypts the security association using the key stream and sends the decrypted session key to the cipher engine 424A, 424B (block 618). The cipher engine 424A, 424B decrypts the encrypted packet using the session key (block 620) and sends the decrypted packet back to the network controller/packet processor 220. The network controller/packet processor 220, in turn, sends the packet to the host processor 224 for processing (block 622).

The system performs complementary operations when the host processor 224 sends a secure packet to a remote peer over the network 222.

Figure 9:
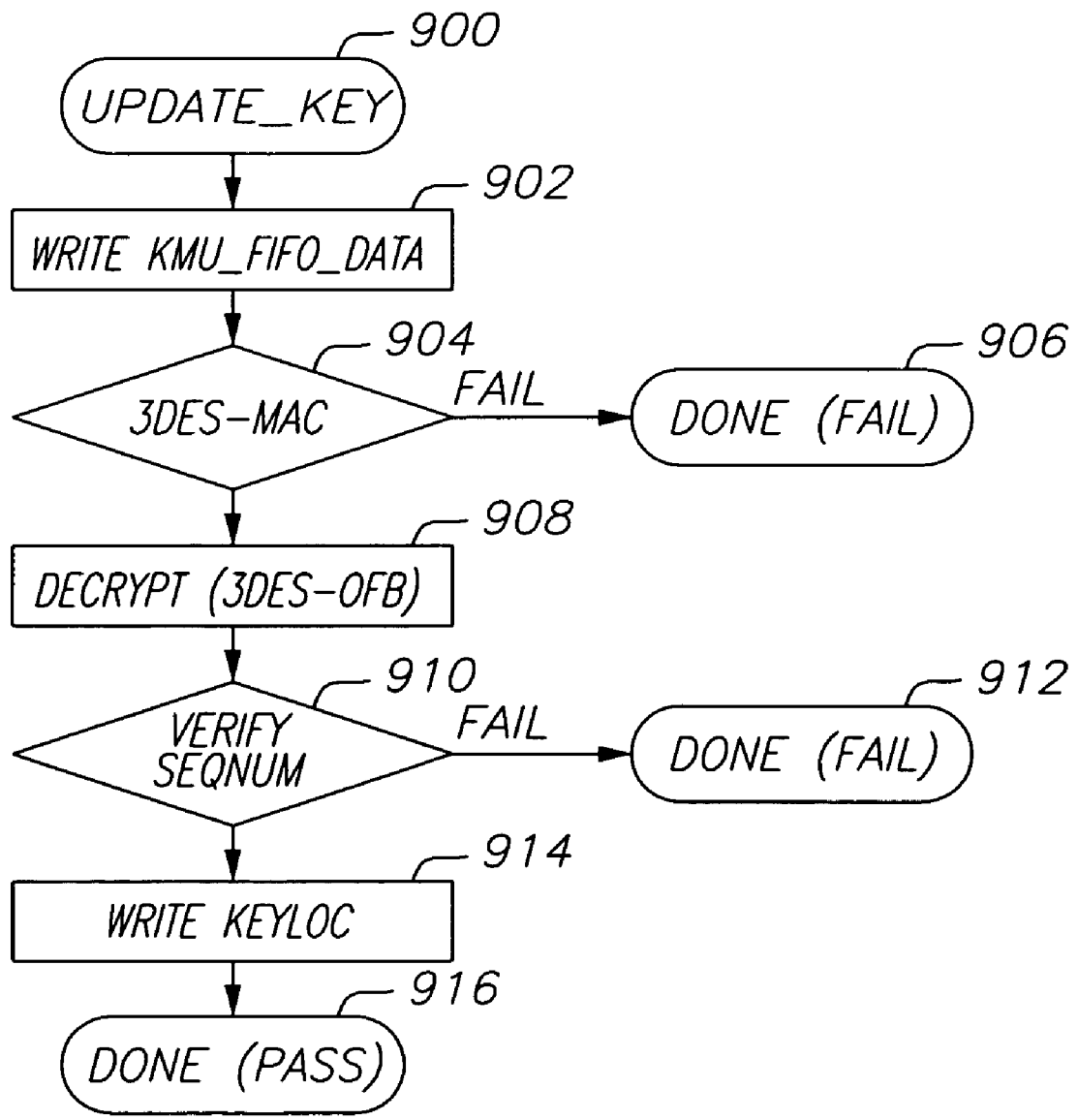
FIG. 9 is a flowchart representative of one embodiment of key update operations that may be performed in accordance with the embodiment of FIG. 2.

FIG. 9 depicts key update operations that may be performed in conjunction with the operations of FIG. 6. The key manager 426 provides a mechanism to update the keys (e.g., KEK) 434 that are stored in the EEPROM. In one embodiment, the host processor 224 must know the previous key to change the current key. Initially, the host processor 224 fills the loading queue with 48 bytes of the new encrypted version of the key location (including the MAC value). The host processor 224 fills the loading queue using the write FIFO register (block 902). The key manager 426 uses 3DES-MAC with the KMAC key and initial vector equal to zero to authenticate the data in the loading queue as the new key used by the key manager 426 (block 904). If the authentication fails, the key manager 326 generates an error signal (block 906).

If the authentication passes, the rest of the data (NOUNCE, new KMAC and new KEK) is decrypted using 3DES-OFB with the current KEK (block 908). The decrypted sequence number is verified to be the next incremented sequence number (i.e., one plus the sequence number that was advertised by the key manager) (block 910). The decrypted value of the entire key structure is placed in the key location that as not loaded during the INIT_KEY command (block 914).

The inventions described herein may provide several advantages over conventional systems. For example, the devices that perform the key generation and the key utilization may be located apart from one another. In addition the security association database may be located apart from the other components in the system. Moreover, these advantages may be achieved without degrading the performance of the system.

Referring to FIGS. 10 through 13, examples of structures and operations of one embodiment of a cryptographic system that uses public keys will be treated in more detail.

Figure 10:
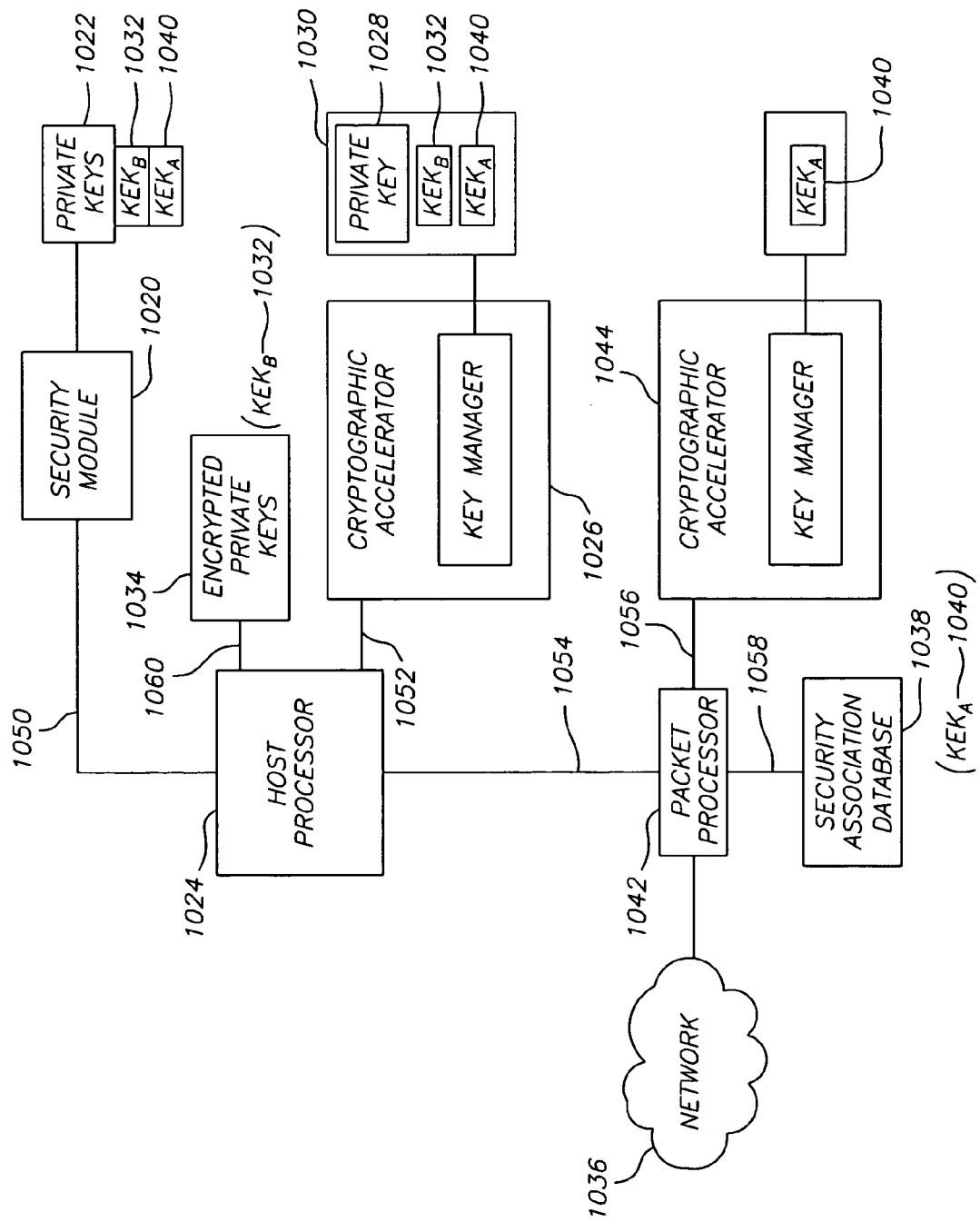
FIG. 10 is a block diagram of another embodiment of a cryptographic system constructed in accordance with the invention.

FIG. 10 depicts an embodiment of the invention that supports asymmetric key exchange to provide data security in a network. The embodiment of FIG. 10 is similar to the embodiment of FIG. 3, the primary difference being that the host processor 322 of FIG. 3 has been replaced with several individual components to facilitate discussion of the operation of these components. In practice, the actual physical configuration of the individual components may take many forms.

As discussed above in conjunction with FIG. 3, the security module 1020 stores private keys 1022 and controls the generation of keys, yet the majority of the cipher processing is performed by the cryptographic accelerator 1026. Hence, the system must provide a secure method for transferring keys between the security module 1020 and the other components.

Figure 11:
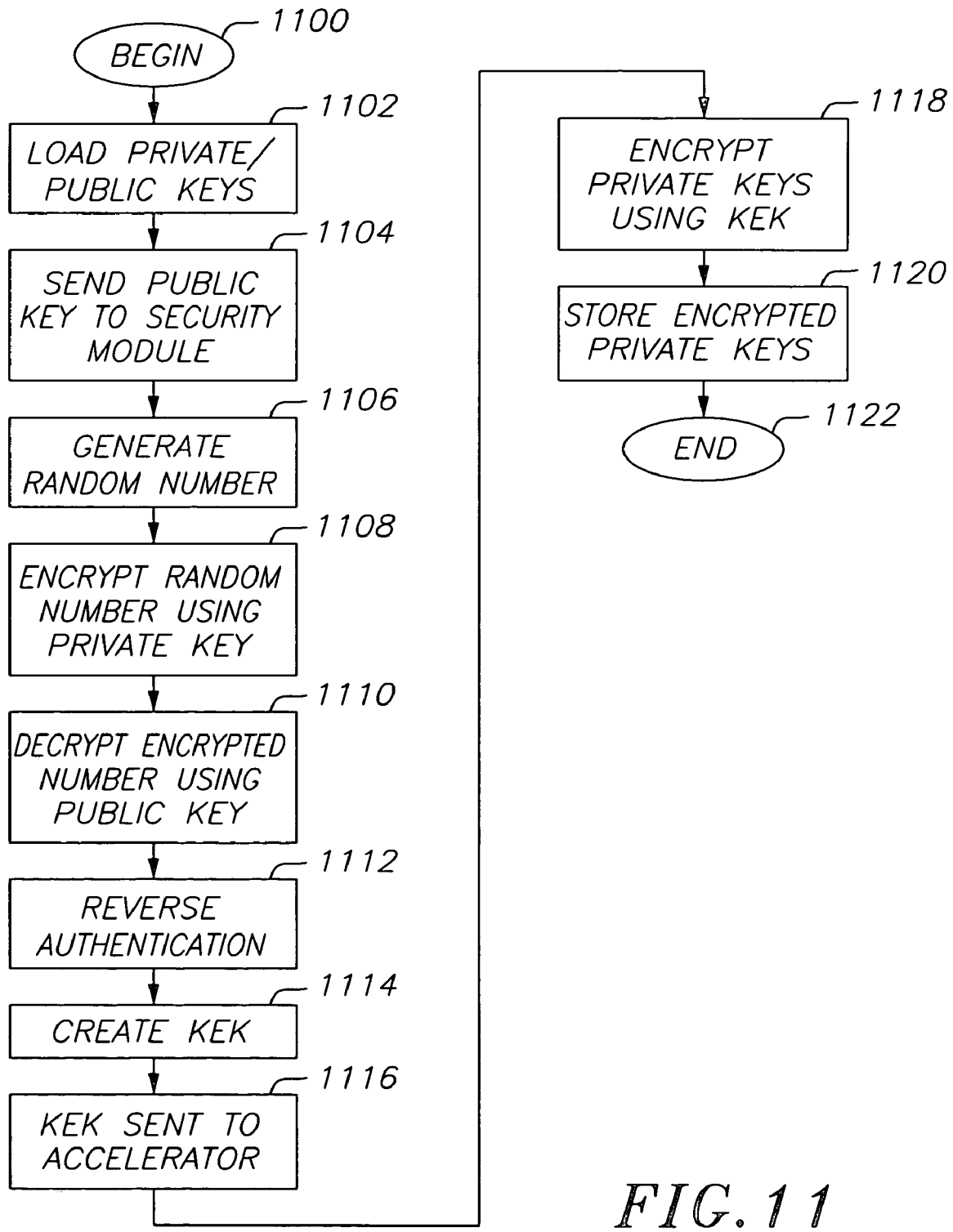
FIG. 11 is a flowchart representative of one embodiment of initialization operations that may be performed in accordance with the embodiment of FIG. 10.

In general, this secure connection may be implemented using a standard zero knowledge authentication technique including, for example, DSA or digital signature algorithms. FIG. 11 describes one embodiment of operations that may be performed relating to setting up this secure data transfer. When the cryptographic accelerator 1026 is manufactured, a private key 1028 is stored in the EEPROM 1030. As discussed above, this EEPROM typically is protected with epoxy or some other method. In addition, a signed public key for the cryptographic accelerator may be stored in the EEPROM or some other data memory (block 1102). The signed public key, commonly referred to as a certificate, provides verification from a trusted source that the public key is valid.

To initiate the asymmetric key exchange, the cryptographic accelerator 1026 sends its public key to the security module 1020 (block 1104). The security module then generates a random number and sends it to the cryptographic accelerator 1026 (block 1106). The cryptographic accelerator 1026 encrypts the random number with its private key and sends the result back to the security module 1020 (block 1108). The security module 1020 uses the cryptographic accelerator's public key to decrypt the encrypted random number (block 1110). If this test passes, the security module 1020 has authenticated the identity of the cryptographic accelerator 1026. Typically, the security module 1020 and the cryptographic accelerator 1026 will perform a similar process in the reverse direction so that the cryptographic accelerator 1026 can authenticate the security module 1020 (block 1112).

At this point, the security module 1020 and the cryptographic accelerator 1026 have established a secure method of communicating. The security module 1020 may send data to the cryptographic accelerator 1026 using the cryptographic accelerator's public key.

Accordingly, the security module 1020 creates $KEK_B$ 1032 and $KEK_A$ 1040, encrypts them (block 1114), then sends them to the cryptographic accelerator 1026 (block 1116). $KEK_B$ 1032 is then used by the cryptographic accelerator 1026 to decrypt keys sent from the security module 1020 to the cryptographic accelerator 1026. In particular, the security module 1020 encrypts the host processor's 1024 private keys (block 1118) and sends them to the private key database 1034 (block 1120).

Figure 12:
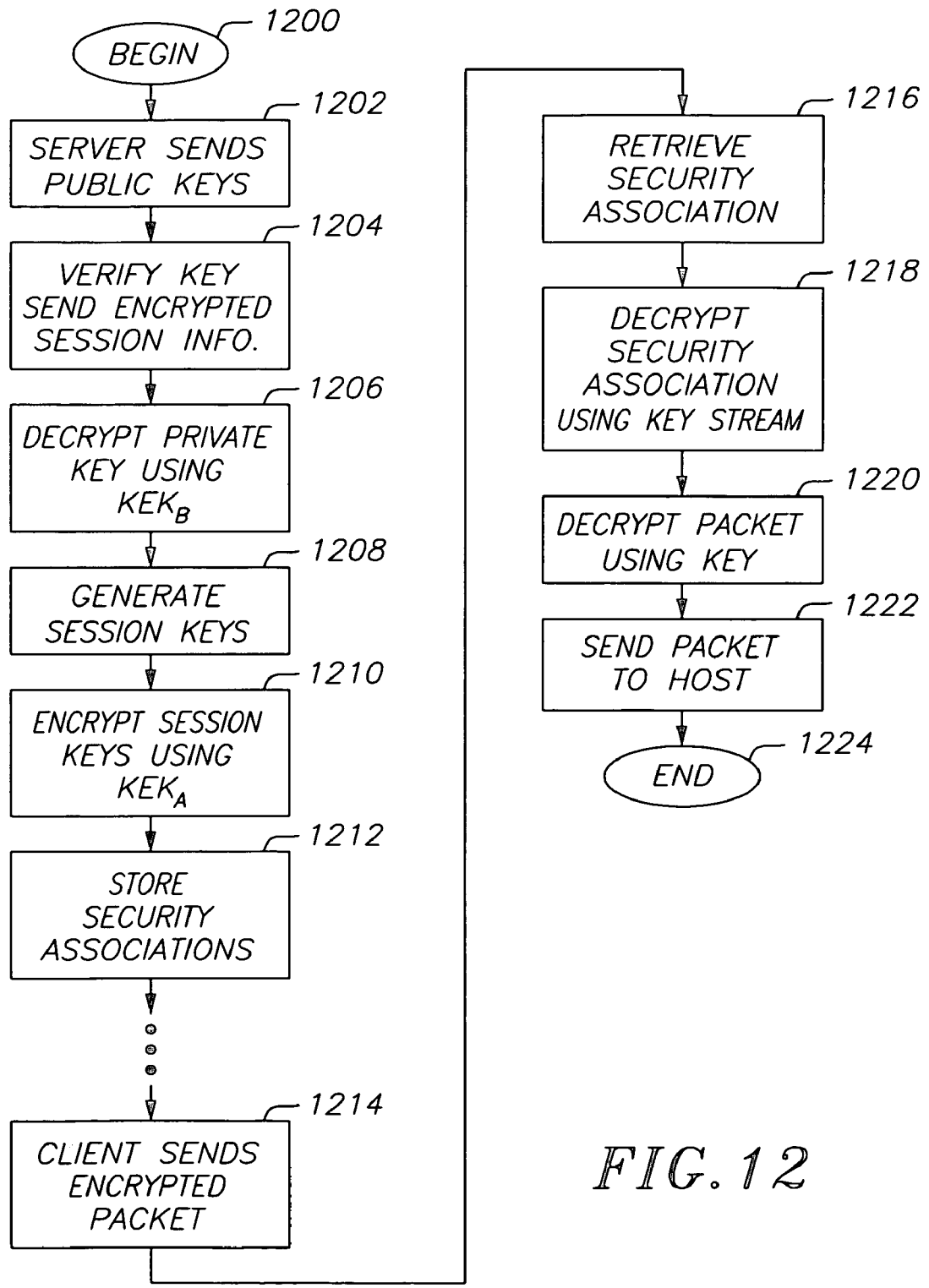
FIG. 12 is a flowchart representative of one embodiment of packet processing operations that may be performed in accordance with the embodiment of FIG. 10.

FIG. 12 describes packet processing operations that may be performed once the encrypted private keys have been loaded into the private key database 1034. As discussed above, to start a session between a client and a server (e.g., the host processor 1024), a set of keys must be created for the session. For example, the server sends its signed public key to the client application (block 1202). After verifying this public key, the client application sends session information to the server encrypted with the server's public key (block 1204). The server sends this encrypted session information to the cryptographic accelerator 1026. Next, the cryptographic accelerator 1026 identifies the associated encrypted private key for the server.

In a similar manner as discussed above, the cryptographic accelerator 1026 decrypts the encrypted private key using the $KEK_B$ 1032 (block 1206). Then, the cryptographic accelerator 1026 decrypts the encrypted session information using the server's private key. From the session information and the decrypted private key a shared secret is created from which the cryptographic accelerator 1026 creates a set of keys for the session (block 1208). The cryptographic accelerator 1026 then encrypts these keys and sends them to the client. Next, the cryptographic accelerator 1026 encrypts the security association (e.g., the session keys and, in some embodiments, associated information) using $KEK_A$ 1040 (block 1210). Then, the cryptographic accelerator 1026 sends the security association data to the security association database 1038 (block 1212).

When the client application sends encrypted packets to the server (block 1214), the packet processor 1042 cooperates with the cryptographic accelerator 1044 to decrypt the packets. This operation as described at blocks 1216-1222 is similar to the operation discussed in conjunction with FIG. 6 at blocks 612-622. Again, the system performs complementary operations when the server sends encrypted packets to the client application.

In accordance with this embodiment of the invention, the KEK ($KEK_A$ 1040 or $KEK_B$ 1032) may be updated using an asymmetric key exchange procedure, for example, as described above. Accordingly, the KEK may be updated without the security module 1020 having to prove it knows the value of the previous KEK.

Moreover, this embodiment provides a distinct advantage in that the security module 1020 may be placed in a location that is remote from the other components of FIG. 10. Also, because the majority of the key management operations are not performed by the security module, a single security module can support many sessions.

In addition, this embodiment provides an advantage over a symmetric key implementation whereby the same initial key is not sent out with the devices. Thus, there is less need to keep track of every device that is shipped to protect the initial key. Moreover, the asymmetric approach may provide a signature trail and authentication trail, thereby providing increased system security. Finally, it is easier to locate the host processor 1024 and the EEPROM 1030 for the cryptographic accelerator 1026 in separate locations because they do not have to be manufactured with the same initial key value.

The embodiment of FIG. 10 shows two separate cryptographic accelerator components 1026, 1044. In a alternative embodiment, the cryptographic accelerators 1026, 1044 may be combined into a single integrated circuit. In this case, after the top cryptographic accelerator 1026 derives the session keys, they may be encrypted using a KEK then sent to the security association database. In this way, the session keys never leave the cryptographic accelerator integrated circuit in an unencrypted state.

Figure 13:
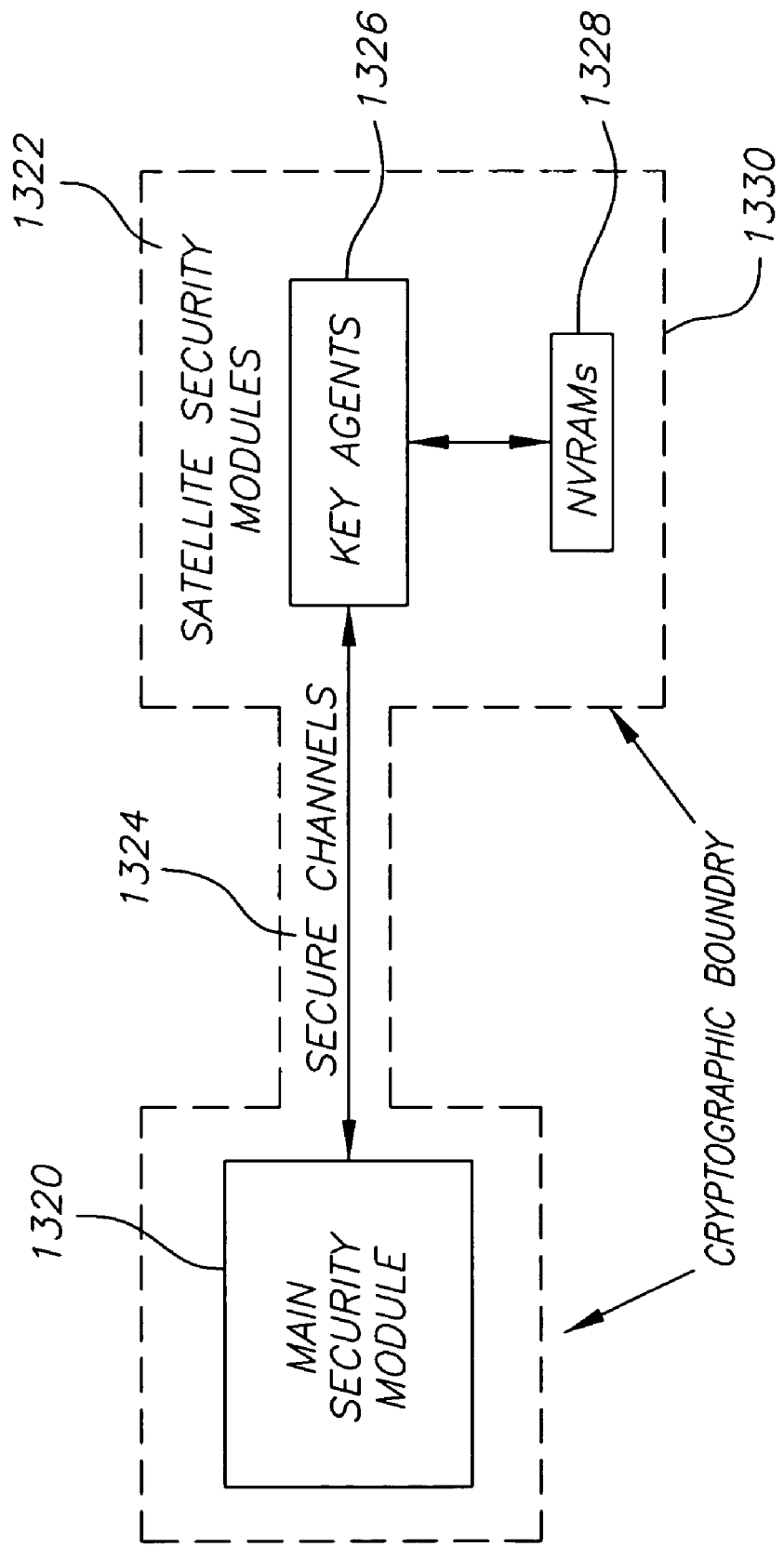
FIG. 13 is a block diagram of another embodiment of a cryptographic system constructed in accordance with the invention.

FIG. 13 is a high-level block diagram of one embodiment of a security system constructed according to the invention. A main security module 1320 communicates with one or more satellite security modules 1322 over one or more secure channels 1324. Each satellite security module 1322 includes processing capability (not shown) and at least one key agent 1326 and non-volatile memory device 1328. In a typical configuration, the satellite security modules 1322 will be located throughout a data network (e.g., the Internet).

As represented by dashed line 1330, the main security modules 1320, the secure channel 1324 and the satellite security modules 1322 cooperate to form a cryptographic boundary. For example, in one embodiment the main security module is FIPS-140-2 certified. Application of the teachings of the invention enables the satellite security module 1322 to maintain the cryptographic perimeter of the main security module 1320 even though it may be physically detached and located some distance away from the main security module 1320. For example, the satellite security module 1322 may be implemented in blade servers or in router service blades.

A main security module 1320 that meets all of the requirements of FIPS-140-2 must provide various degrees of physical protection, access control, and cryptographic key management. Thus, to maintain that level of security throughout the system, the satellite security module 1322 may need to implement similar protections.

For the purposes of this disclosure, the term main security module refers to a device that at a minimum distributes keys, protects the keys that it distributes and can communicate securely with another device that manages keys (e.g., a satellite security module).

For the purposes of this disclosure, the term satellite security module refers to a device that at a minimum decrypts data, protects keys and can communicate securely with another device that manages keys (e.g., a main security module).

The key agent may performs functions related to processing key management protocol messages, reading and writing the non-volatile RAM, decrypting and encrypting security associations and executing self-test sequences required by FIPS-140-2.

In practice, a main security module 1320 and a satellite security module 1322 may be optionally configured to perform a variety of other functions. For example, in FIG. 3 the security module 1320 and associated data memory 330 is one embodiment of a main security module 1320, and the cryptographic accelerator 326 with its key manager 334 and the EEPROM 336 is one embodiment of a satellite security module 1322.

The cryptographic boundary 1330 may be accomplished using the techniques described herein such as encrypting data in the devices and associated memory. For example, security associations appear in the clear within the cryptographic boundary 1330. A key component of the cryptographic boundary is the secure channel 1324. The secure channel 1324 is used to initialize and control the satellite security modules 1332 and facilitates secure transfer of the KEKs and management information.

In one embodiment, the secure channel 1324 may be established through the host processor (e.g., processor 1024 in FIG. 10). Here, although the path through the host processor is not inherently secure, the communications between the main security module 1320 and the satellite security module 1322 are secured.

Typically, the main security module 1320 initiates the secure channel exchanges. For example, the main security module 1320 will create a message and send it to the host processor. The host processor then sends a command to the satellite security module 1322. This command is followed by a response from the satellite security module 1322 that the host processor returns to the main security module 1320.

The secure channel 1324 may be established and implemented with many different protocols. In addition, the secure channel 1324 may support a variety of key management messages. Several examples follow. These examples are merely representative and do not limit the protocols that may be used in implementing the invention.

The shared secret may be established, for example, using shared secret protocols such as Unauthenticated Diffie-Hellman, One-Way RSA Authenticated Diffie-Hellman, Mutually Authenticated Diffie-Hellman and Shared Secret ReKey. These protocols have the property that they can be implemented using the request/response message format described above.

In Unauthenticated Diffie-Hellman the main security module and the satellite security module share public knowledge of a Diffie-Hellman instance, consisting of a prime number p and generator g. This is the basic Diffie-Hellman exchange.

1. Initiator generates random number xi, and creates public number $yi=g^{xi}$ mod p;
2. Initiator sends yi to the responder, along with a nonce Ni;
3. Responder generates a random number xr, public number $yr=g^{xr}$ mod p;
4. Responder generates the Diffie-Hellman shared secret, $K=yi^{xr}$ mod p, and nonce Nr;
5. Responder generates as much key material stream as needed using HMAC(K, Ni || Nr || i), for I=0, 1, 2, . . . ;
6. Responder returns yr to the initiator, along with nonce Nr;
7. Initiator derives shared key material using the same formula.

This is a simple and standard protocol that creates FIPS quality shared key material. Here, the satellite security module only needs access to the Diffie-Hellman instance constants, and these could be included in the integrated circuit logic. However, this approach may be vulnerable to man-in-the-middle (MITM) attacks that could compromise the secure channel and all KEKs exchanged over the secure channel.

In One-Way RSA Authenticated Diffie-Hellman the main security module and satellite security module share public knowledge of a Diffie-Hellman instance, as above. In addition, the main security module has an RSA key, and the SM has a trusted copy of the main security module public key.

1. Initiator generates random number xi, and creates public number $yi=g^{xi}$ mod p;
2. Initiator sends yi to the responder, along with a nonce Ni and its signature over the combination.;
3. Responder verifies the signature and generates a random number xr, public number $yr=g^{xr}$ mod p;
4. Responder generates the Diffie-Hellman shared secret, $K=yi^{xr}$ mod p, and nonce Nr;
5. Responder generates as much key material stream as needed using HMAC(K, Ni || Nr || i), for I=0, 1, 2, . . . ;
6. Responder returns yr to the initiator, along with nonce Nr. Responder uses the KEK from the key material stream to compute HMAC(KEK, xi || xr || Ni || Nr);
7. Initiator derives shared key material using the same formula, and verifies the HMAC over the exchange parameters.

This also only requires public constants at the satellite security module. However, the main security module public key must be specific to the main security module, and could either be provided using a write once memory or using two levels of RSA keys and a root key loaded at manufacturing time. The main security module would supply a digital certificate signed by the root key to establish the trusted public key at the satellite security module.

This is secure against MITM attacks, but not against spoofing by a satellite security module imposter. Moreover, the main security module could inadvertently disclose the KEKs for decrypting security associations to an attacker.

In Mutually Authenticated Diffie-Hellman the main security module and satellite security module share public knowledge of a Diffie-Hellman instance, as above. For mutual authentication, both the main security module and the satellite security module can have an RSA public/private key pair. However, the same result can be achieved using a shared secret S. In effect, S is used as a "password" to authenticate the exchange.

1. Initiator generates random number xi, and creates public number $yi=g^{xi}$ mod p;
2. Initiator sends yi to the responder, along with a nonce Ni;
3. Responder generates a random number xr, public number $yr=g^{xr}$ mod p;
4. Responder generates the Diffie-Hellman shared secret, $K=yi^{xr}$ mod p, and nonce Nr;
5. Responder generates as much key material stream as needed using HMAC(K, Ni || Nr || S || i), as above;
6. Responder returns yr to the initiator, along with nonce Nr and an HMAC over the exchange parameters. Responder uses the KEK from the key material stream to compute this value as HMAC(KEK, xi || xr || Ni || Nr);
7. Initiator derives shared key material using the same formula, and verifies the HMAC over the exchange parameters.

This is a much simpler protocol and is secure against MITM and spoofing, but requires a pre-existing shared secret. Although this could be installed at manufacturing time, in practice an unchangeable secret may be difficult to manage over time. The shared secret is used for authentication, not to provide entropy for key establishment. Nonetheless, it must be protected from disclosure as would a PIN, and must be contained within the cryptographic boundary.

In Shared Secret ReKey the main security module and satellite security module share only a secret string value S.

1. Initiator generates nonce Ni and sends it to the responder;
2. Responder generates nonce Nr, and as much key material stream as needed using HMAC(S, Ni || Nr || i), for I=0, 1, 2, . . . ;
3. Responder returns Nr to the initiator, along with an HMAC over the exchange parameters. Responder uses the KEK from the key material stream to compute HMAC(KEK, Ni || Nr);
4. Initiator derives the shared key material, and verifies the HMAC.

If a shared secret is to be used, this is a simpler approach, requiring no Diffie-Hellman constants or public key operations. However, all entropy in the shared key comes from exclusively from this secret.

Before the secure channel has been established, the satellite security module will be in an unsecure state. From this state the satellite security module may establish a secure channel over which it can be given key management messages containing KEKs and ancillary parameters. The mutually authenticated Diffie-Hellman protocol may be used here to establish the secure channel, although other protocols may be used. For the mutually authenticated Diffie-Hellman protocol, the satellite security module initially has: A Shared Secret with the main security module (S); Diffie-Hellman parameters (p, g).

To establish the Secure Channel, the main security module must have been initialized with the satellite security module's shared secret. The shared secret must be protected within the cryptographic boundary, but the other constants can be public. The key material is derived using an HMAC-SHA-1, keyed using a device identity string and the shared secret, as described above. This key material may be used as follows: 16 bytes for an AES key; 20 bytes for an HMAC key.

Once the secure channel is established, the key agent transitions to the "established" state. The satellite security module key agent will be willing to accept a key management message from the main security module if it is received over the secure channel.

The key management messages may be encrypted in the same way as IPsec ESP, using AES-CBC, and then authenticated with an HMAC-SHA1-96. A random initial vector is generated for each message. This is intended to leverage an existing IPsec ESP implementation and has known security properties. However, a simpler message format may be used. The messages can contain KEKs and other secrets. Different KEKs may be used for different purposes. For example, there might be a different KEK for private keys than for the traffic encryption keys used with IPsec or SSL. Typically, the security module maintains the KEKs in device memory. The KEKs may be written to EEPROM or other non-volatile random access memory ("NVRAM"), if available. Messages also may contain management commands or requests, such as: initiate self-test sequence; read or clear status counters; clear all keys; and reset secure channel.

Figure 14:
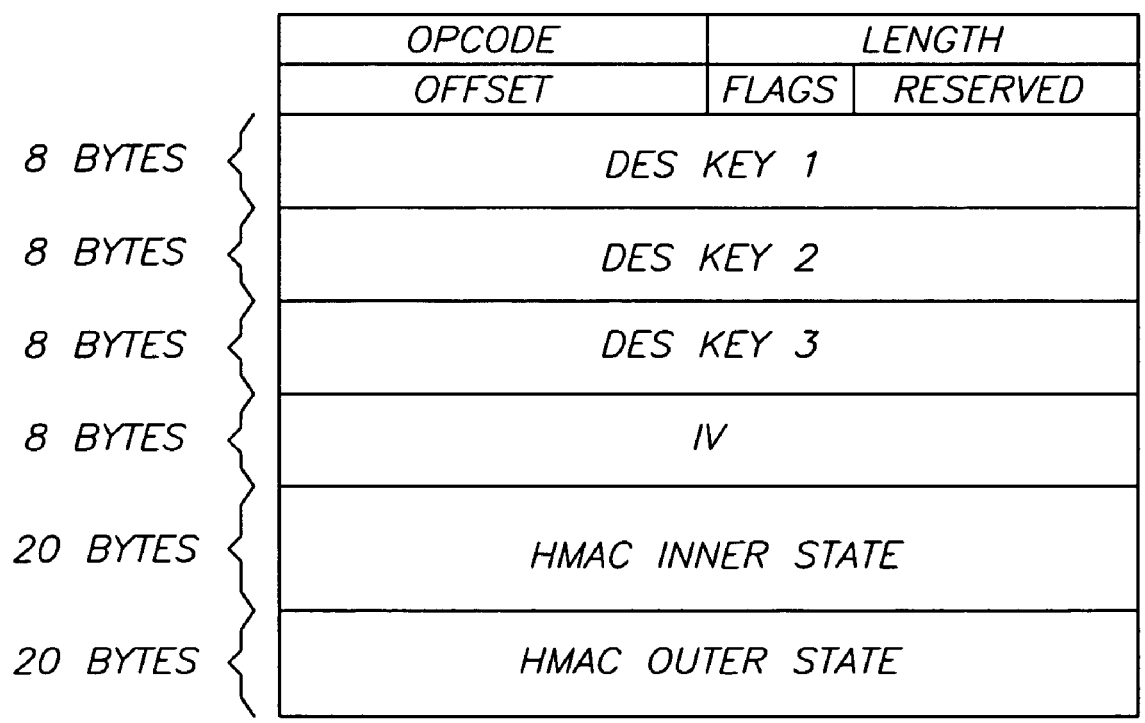
FIG. 14 is a representation of one embodiment of a command context.

One embodiment of the invention uses two primary programming data structures for handling IPsec commands. The MCR structure is used to send one or more "Packet Descriptors" to a device (e.g., a cryptographic accelerator). Each Packet Descriptor includes pointers to a Command Context and to a pair of input and output Chained Entry descriptor lists. The first descriptor in each list is supplied in the Packet Descriptor itself. The Command Context indicates the operation to be performed. For most operations, it also supplies the keys and secrets. For example, FIG. 14 shows the Command Context for IPsec using 3DES and HMAC-SHA-1 or HMAC-MD5.

In one embodiment of the invention, key protection is provided using a cached command context method. This method provides the capability to load a Command Context into on-chip memory and use it for a subsequent command. In other words, the security association would contain an entire Command Context structure. The cryptographic accelerator may provide on-chip memory for the cache, one for each MCR type (e.g., 96 bytes for MCR1 and 648 bytes for MCR2, enough for the AES 256 bit key IPsec context or the RSA 2048-bit Private Key context). The cryptographic accelerator may have an additional command code to load and decrypt a Command Context. The cache and KEK to use would be determined by the MCR on which the command was issued. A cached command context would be invoked using a Packet Descriptor with a zero Command Context pointer.

Security associations could be encrypted as though IPsec, using 3DES CBC. The initial vector ("IV") would be part of the KEK. Security associations could be authenticated using HMAC-SHA-1-96.

Typical applications that use SSL or TLS RSA operations, such as web servers, use a single RSA key per virtual server. This same key is used repeatedly to decrypt exchanged pre-master secrets for that server. For such applications, the performance impact of decrypting the RSA private key would be negligible.

For other operations, in particular IPsec, the overhead of decrypting may be quite noticeable. For IPsec, the Explicit IV variant should be used, as the IV should not be part of the Command Context.

Not all command codes need encrypted keys. For example, it is unnecessary to encrypt the keys for an RSA public key operation. The following operations would be protected:
RSA Private Key (648 bytes)
DSA Sign (308 bytes)
IPsec 3DES (80 bytes)
IPsec AES (96 bytes)

Key protection need not be used for ARCFOUR, as it would require writing out encrypted state. Note that ARCFOUR is not a FIPS approved algorithm. SSL 3DES requires an IV with the Command Context. Diffie-Hellman would be excluded since the secret is input or output in a data fragment.

In another embodiment, an in-line key method is used to protect keys. Here, keys are potentially decrypted with applicable Command Context loads. This may cause a greater performance impact, but it extends the protection further. In particular, data paths for decrypting the input and output data for Diffie-Hellman could be added.

It should be appreciated that the inventions described herein are applicable to and may utilize many different protocols and standards and modifications and extensions of those protocols and standards including, for example and without limitation, IPsec, SSL and FCsec. Moreover, a variety of cryptographic and signature algorithms and modifications and extensions thereof may be used including, for example and without limitation, RSA, Diffie-Hellman, elliptic curve and DSA.

It should also be appreciated that the inventions described herein may be constructed using a variety of physical components and configurations. For example, a variety of hardware and software processing components may be used to implement the functions of the main security modules, satellite security modules, host processors, cryptographic accelerators, security modules, network controller and the packet processors. Typically, the network controller and packet processing functions may be implemented in a network processor. These components may be combined on one or more integrated circuits.

In addition, the components and functions described herein may be connected in many different ways. Some of the connections represented by the lead lines in the drawings may be in an integrated circuit, on a circuit board, over a backplane to other circuit boards, over a local network and/or over a wide area network (e.g., the Internet). Thus, some of the components may be located in a remote location with respect to the other components. Typically, one or more of the connections represented by the lead lines in the drawings (e.g., lead lines 240-244 and 1050-1060 in FIGS. 2 and 10) may, for example, comprise a data network. In addition, these connections may be made with physical wire, fiber and/or wireless connections, for example.

Some of the connections between components made comprise secure connections (e.g., FIPS-140-2 compliant) while other connections comprise unsecure connections.

A wide variety of devices may be used to implement the data memories (e.g., the databases and non-volatile memories) discussed herein. For example, a data memory may comprise RAM, disk drive, FLASH or other types of data storage.

In one embodiment of the invention, the non-volatile memory may reside on the same integrated circuit as the key manager. This embodiment may provide more security for a KEK and/or a private key.

In addition, the non-volatile memory may comprise a one-time-programmable circuit for storing, for example, an initial value for KEK, a private key or a shared secret. Examples of one-time-programmable circuits may be found in the following U.S. patent applications which are assigned to the same Assignee as this application: U.S. patent application Ser. No. 10/141,197, filed May 8, 2002 and entitled USING AN ON-CHIP ONE-TIME PROGRAMMABLE NON-VOLATILE MEMORY (OTP NVM) FOR CONFIGURING DEVICE FEATURES; U.S. patent application Ser. No. 10/141,599, filed May 8, 2002 and entitled SYSTEM AND METHOD FOR PROGRAMMING NON-VOLATILE MEMORY. The contents of these applications are hereby incorporated by reference herein.

Non-volatile memory such as a one-time programmable circuit may be employed in the any of the components discussed herein including a cryptographic accelerator or a security module. For example, a shared secret could be loaded into the main security module and the satellite security modules at the time of their manufacture. This shared secret could then be used to mutually authenticate the main security module and the satellite security module.

The invention may be practiced using different types of cipher engines. For example, in one embodiment of the invention KEK is decrypted using a block cipher, rather than a stream cipher. In one embodiment of the invention, the same hardware may be used to perform the message authentication and decryption operations. Both the CVC MAC and the OFB routines run an encryption mode of triple DES. Hence, a significant reduction in gate count may be achieved by proving control to the inputs of the triple DES to provide different initial values and keys to the triple DES depending on which operation is being performed.

In one embodiment of the invention, the key manager provides access to unsecured portions of the EEPROM to other components in the system. Thus, the system may be configured with only a single EEPROM.

In another embodiment of the invention, the EEPROM may be shared among multiple key managers. This provides the advantage whereby the key managers can share the same KEK. Thus, the system may be configured so that any one of several cryptographic accelerators may process a given incoming packet.

In summary, the invention described herein teaches improved techniques for providing secured data transmission and for managing cryptographic keys. While certain exemplary embodiments have been described in detail and shown in the accompanying drawings, it is to be understood that such embodiments are merely illustrative of and not restrictive of the broad invention. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A method of cryptographically processing data in a host cryptographic system, comprising:

generating, during initialization of the host cryptographic system, a key stream in a cryptographic accelerator using an encryption algorithm and a key encryption key as the encryption key for the encryption algorithm, wherein the key encryption key is shared between the cryptographic accelerator and a security module;

storing the key stream in a data memory of the cryptographic accelerator;

encrypting, at the security module, a cipher key for a session using the key encryption key;

storing the encrypted session cipher key in a database;

receiving, at the host cryptographic system, a message associated with the session;

communicating the message and the encrypted session cipher key to the cryptographic accelerator;

decrypting the encrypted session cipher key using a stream cipher and the stored key stream to obtain the session cipher key; and using the session cipher key to encrypt or decrypt the message.

2. The method of claim 1 wherein:

the message comprises data encrypted with a public session key; and the stored encrypted session cipher key comprises a private session key.

3. The method of claim 1:

wherein decrypting the encrypted session cipher key is performed by an integrated circuit.

4. The method of claim 3 wherein using the session cipher key to decrypt the message is performed by the integrated circuit.

5. The method of claim 3 wherein using the session cipher key to encrypt the message is performed by the integrated circuit.

6. The method of claim 1 wherein encrypting or decrypting the session cipher key comprises using a symmetric key encryption key, the method further comprising storing the symmetric key encryption key.

7. The method of claim 1 wherein encrypting or decrypting the session cipher key comprises using an asymmetric key encryption key, the method further comprising storing the asymmetric key encryption key.

8. The method of claim 1, wherein decrypting the stored encrypted session cipher key by the stream cipher comprises exclusively-ORing the encrypted session cipher key with the key stream.

9. A security processing host cryptographic system, comprising:

a security module configured to encrypt a cipher key for a session using a key encryption key;

a database configured to store the encrypted session cipher key; and a cryptographic accelerator, adapted to receive a message and the encrypted session cipher key, wherein the cryptographic accelerator comprises:

a keystream generator configured to generate, during initialization of the host cryptographic system, a key stream using an encryption algorithm and a key encryption key as the encryption key for the encryption algorithm, wherein the key encryption key is shared between the cryptographic accelerator and the security module;

a data memory configured to store the key stream; and a stream cipher module configured to decrypt the encrypted session cipher key using the stored key stream to obtain the session cipher key.

10. The security processing system of claim 9 further comprising a data network for connecting the security module to at least one of the group consisting of the database data memory and the cryptographic accelerator.

11. The security processing system of claim 9 further comprising a data network for connecting the database data memory to at least one of the group consisting of the security module and the cryptographic accelerator.

12. The method of claim 1, wherein generating further comprises:
generating, during initialization of the host cryptographic system, the key stream in the cryptographic accelerator using a block encryption algorithm and the key encryption key as the encryption key for the block encryption algorithm.

13. The security processing system of claim 9 further comprising a non-volatile memory for storing the key encryption key.

14. The security processing system of claim 9, wherein the stream cipher is further configured to exclusively-OR the encrypted session cipher key with the stored key stream to obtain the session cipher key.

15. The method of claim 1, wherein the message comprises a data packet.

16. A method for managing cipher keys of a host cryptographic system, comprising the steps of:
generating a private key;
generating at least one key encryption key of the host cryptographic system;
encrypting the private key using the at least one key encryption key;
sending the at least one key encryption key over a secure channel;
sending the at least one encrypted private key over a secure channel;
storing the at least one encrypted private key that was sent over the secure channel;
decrypting the stored at least one encrypted private key using the at least one key encryption key;
generating at least one session key using the at least one decrypted private key;
encrypting the at least one session key using the at least one key encryption key;
storing the at least one encrypted session key; and
decrypting the stored at least one encrypted session key using the at least one key encryption key to provide a session key to encrypt or decrypt a data packet,
wherein all of the above steps are performed by the host cryptographic system.

17. The method of claim 1, further comprising:
encrypting the key encryption key at the security module using a cryptographic accelerator public key;
sending the encrypted key encryption key to the cryptographic accelerator; and
decrypting the key encryption key at the cryptographic accelerator using a cryptographic accelerator private key.

18. The method of claim 17, further comprising:
performing mutual authentication between the cryptographic accelerator and the security module prior to exchange of the key encryption key.

19. The method of claim 17, further comprising:
generating the key encryption key within the security module.

20. The method of claim 17, further comprising:
receiving the key encryption key at the security module prior to exchange of the key encryption key.

* * * * *